US011168010B2

(12) United States Patent
Fortson

(10) Patent No.: US 11,168,010 B2
(45) Date of Patent: Nov. 9, 2021

(54) CHLORINATOR DEVICE, SYSTEM, AND METHOD

(71) Applicant: Robert Gage Fortson, Conway, SC (US)

(72) Inventor: Robert Gage Fortson, Conway, SC (US)

( * ) Notice: Subject to any disclaimer, the term of this patent is extended or adjusted under 35 U.S.C. 154(b) by 247 days.

(21) Appl. No.: 16/551,539

(22) Filed: Aug. 26, 2019

(65) Prior Publication Data

US 2020/0399152 A1    Dec. 24, 2020

Related U.S. Application Data

(60) Provisional application No. 62/921,467, filed on Jun. 20, 2019.

(51) Int. Cl.
*C02F 1/68* (2006.01)
*C02F 1/76* (2006.01)

(52) U.S. Cl.
CPC .............. *C02F 1/685* (2013.01); *C02F 1/686* (2013.01); *C02F 1/76* (2013.01); *C02F 2209/29* (2013.01)

(58) Field of Classification Search
CPC .. C02F 1/685; C02F 1/686; C02F 1/76; C02F 2201/008; C02F 2209/29; C02F 2209/40
See application file for complete search history.

(56) References Cited

U.S. PATENT DOCUMENTS

| | | | |
|---|---|---|---|
| 5,025,822 A | 6/1991 | Guggisberg | |
| 5,704,767 A | 1/1998 | Johnson | |
| 2001/0010296 A1 | 8/2001 | Hirota | |
| 2002/0170853 A1* | 11/2002 | Alexander | C02F 1/76 |
| | | | 210/167.11 |
| 2006/0042687 A1 | 3/2006 | Specker | |
| 2008/0314807 A1 | 12/2008 | Junghanns | |
| 2009/0107917 A1 | 4/2009 | Capehart | |
| 2017/0225980 A1* | 8/2017 | Simmons | C02F 1/686 |

OTHER PUBLICATIONS

International Search Report for PCT/US20/47800.

\* cited by examiner

*Primary Examiner* — Lucas A Stelling
(74) *Attorney, Agent, or Firm* — The Sladkus Law Group

(57) ABSTRACT

A chlorinator device for chlorinating water to a predetermined chlorination level with chlorine from a source of chlorine. The chlorinator device has an injector that creates a vacuum as water passes through the injector to draw chlorine from the source of chlorine into the injector and an adjustable chlorine flow meter positioned in fluid communication with and between the injector and the source of chlorine to adjust the flow rate of chlorine entering the injector to a predetermined rate.

11 Claims, 5 Drawing Sheets

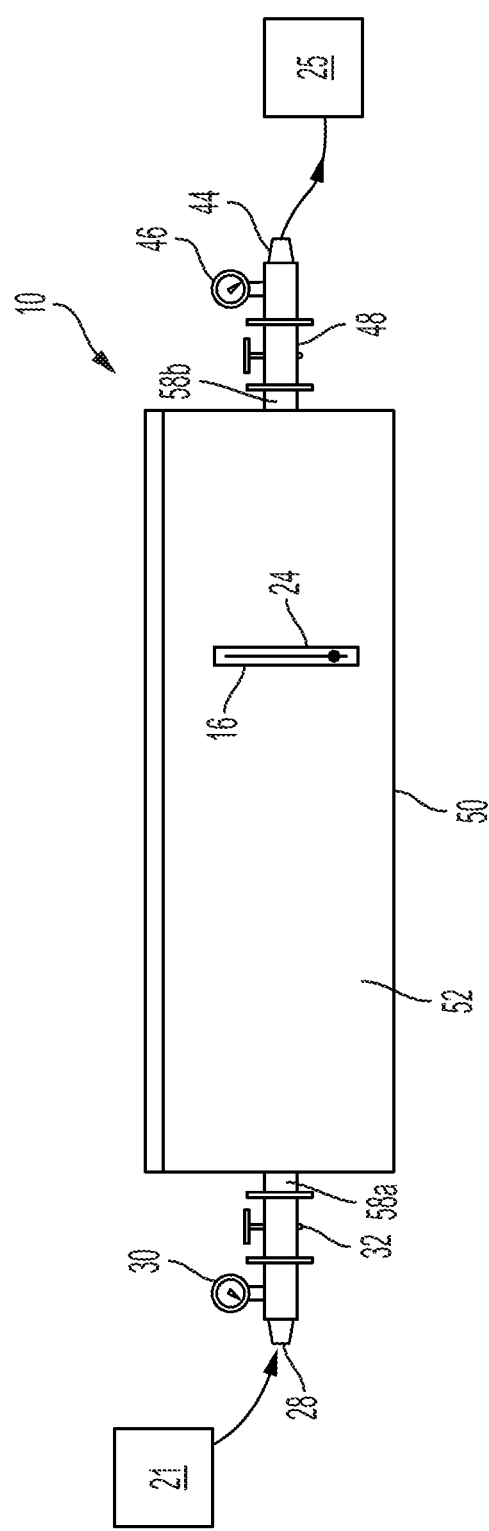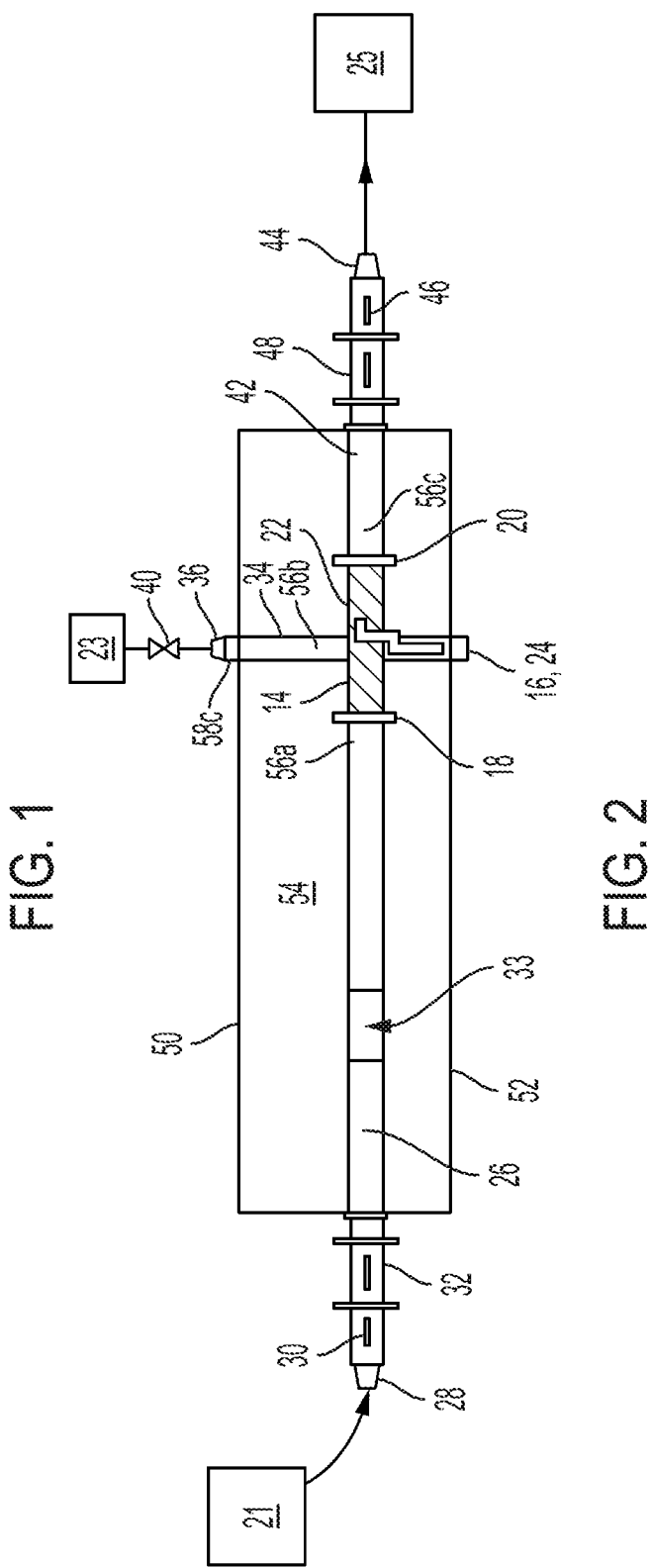

CHLORINATOR DEVICE, SYSTEM, AND METHOD

CROSS-REFERENCE TO RELATED APPLICATIONS

This application claims the benefit of and priority to U.S. Provisional Patent 62/921,467, filed Jun. 29, 2019, which is incorporated in its entirety in this document by reference.

TECHNICAL FIELD

The present disclosure generally relates to a chlorinator device, system and method, and, more particularly, to a chlorinator device, system and method that chlorinates any vessel, such as water mains, water towers and the like to a desired chlorination level.

BACKGROUND

With any new public water project having a water vessel, such as a new water main, the vessel has to pass a series of tests required by the American Water Works Association (AWWA), and state and local purveyor rules and regulations. One test is that the vessel has to pass a pressure test. Then the vessel has to be disinfected and bacteriological samples taken to a certified laboratory. In order to perform these tests with conventional systems and methods, an existing source of water was required at the job site. If there was no existing water source, the tests could not be performed and the vessel could not be certified for use. What is needed is a quick, safe and portable device and system that can used by water departments, government agencies, contractors, and others in the field of water on a global stage to provided chlorinated water to a new vessel for testing.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a chlorinator device for chlorinating a water vessel to a predetermined chlorination level with water from a source of water and chlorine from a source of chlorine, the chlorinator device comprising: an injector having an injector inlet, an opposed injector outlet and a suction port defined in the injector between the injector inlet and the injector outlet, wherein the injector inlet is in fluid communication with the source of water, wherein the suction port is in fluid communication with the source of chlorine, wherein the injector outlet is in fluid communication with the water vessel, and wherein the injector is a venturi injector such that as a water stream passes from the injector inlet to the injector outlet, the injector creates a vacuum to draw chlorine from the source of chlorine and into the water stream passing through the injector. The chlorinator device also comprises an adjustable chlorine flow meter positioned in fluid communication with and between the suction port and the source of chlorine, the adjustable chlorine flow meter configured to adjust the flow rate of chlorine passing through the adjustable chlorine flow meter, wherein the chlorine flow rate is selectively adjustable to a predetermined rate by adjusting the flow rate of the water stream and wherein the chlorine flow rate is selectively adjustable by adjusting the adjustable chlorine flow meter.

The present disclosure also provides a chlorinator system for chlorinating a water vessel to a predetermined chlorination level, the chlorinator system comprising: a chlorinator device comprising: an injector having an injector inlet, an opposed injector outlet and a suction port defined in the injector between the injector inlet and the injector outlet, and wherein the injector outlet is in fluid communication with the water vessel, and wherein the injector is a venturi injector such that as a water stream passes from the injector inlet to the injector outlet, the injector creates a vacuum to draw chlorine from the source of chlorine and into the water stream passing through the injector; and an adjustable chlorine flow meter positioned in fluid communication with and between the suction port and the source of chlorine, the adjustable chlorine flow meter configured to adjust the flow rate of chlorine passing through the adjustable chlorine flow meter, wherein the chlorine flow rate is selectively adjustable to a predetermined rate by adjusting the flow rate of the water stream, and wherein the chlorine flow rate is selectively adjustable by adjusting the adjustable chlorine flow meter. The chlorinator system further comprises: at least one chlorine tank in fluid communication with the suction port of the injector; at least one water tank in fluid communication with the injector inlet; a fluid pump in fluid communication with and positioned between the water tank and the injector inlet, the fluid pump configured to provide pressurized water from the water tank to the injector to create the water stream; an electrical generator electrically coupled to the fluid pump and configured to provide electricity to power the fluid pump; and a transporting device for transporting the chlorinator device, the chlorine tank, the water tank, the fluid pump and the electrical generator.

The present disclosure also provides a method for chlorinating a water vessel to a predetermined chlorination level, wherein the vessel to be chlorinated is fluidly coupled to an existing source of water, wherein a tie-in valve is positioned between the vessel and the source of water and is originally closed to prevent water from moving from the source of water to the water vessel, and wherein the water vessel has a point of discharge that allows water to exit the vessel, the method comprising: providing a chlorinator system comprising: an injector having an injector inlet, an opposed injector outlet and a suction port defined in the injector between the injector inlet and the injector outlet, and wherein the injector outlet is in fluid communication with the water vessel, and wherein the injector is a venturi injector such that as a water stream passes from the injector inlet to the injector outlet, the injector creates a vacuum to draw chlorine from the source of chlorine and into the water stream passing through the injector; and an adjustable chlorine flow meter positioned in fluid communication with and between the suction port and the source of chlorine, the adjustable chlorine flow meter configured to adjust the flow rate of chlorine passing through the adjustable chlorine flow meter, wherein the chlorine flow rate is selectively adjustable to a predetermined rate by adjusting the flow rate of the water stream, and wherein the chlorine flow rate is selectively adjustable by adjusting the adjustable chlorine flow meter; at least one chlorine tank in fluid communication with the suction port of the injector; at least one water tank in fluid communication with the injector inlet; a fluid pump in fluid communication with and positioned between the water tank and the injector inlet, the fluid pump configured to provide pressurized water from the water tank to the injector to create the water stream; an electrical generator electrically coupled to the fluid pump and configured to provide electricity to power the fluid pump; and a transporting device for transporting the chlorinator device, the chlorine tank, the water tank, the fluid pump and the electrical generator; coupling the injector outlet to the water vessel at an injection point on the vessel; opening the point of discharge in the water vessel; pumping pressurized water to the injector inlet with the fluid pump to create a suction of chlorine through the injector that chlorinates the water passing through the injector; opening the tie-in valve to push the water and chlorine solution through the water vessel to the points of discharge; and adjusting the flow rate of the water and chlorine solution to a desired rate with the tie-in valve and the adjustable chlorine flow meter.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIG. 1 is a front elevational view of a chlorinator device positioned in a housing, according to one aspect of the present disclosure.

FIG. 2 is a top plan view of the chlorinator device of FIG. 1, in which a top of the housing has been removed to illustrate interior components of the chlorinator device.

DETAILED DESCRIPTION

Figure 3:
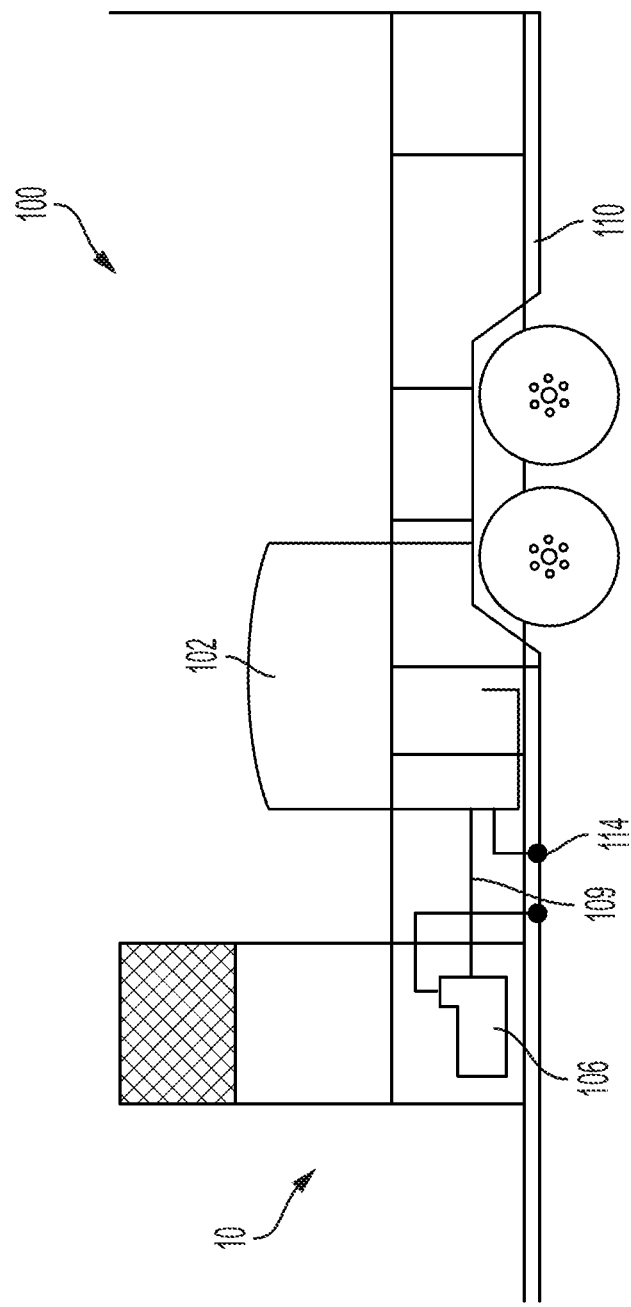
FIG. 3 is a side elevational view of the chlorinator system comprising the chlorinator device of FIG. 1 and a chlorine tank, according to one aspect.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a tine" can include two or more such tines unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not. As used herein, the terms "pipe," "line," and "hose" can be used interchangeably to refer to any vessel configured to convey fluids, such as pipes, hoses, tubes and the like.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a chlorinator device, system, and method for chlorinating vessels such as water mains, water towers, clear wells and the like, according to various aspects. In one aspect, the chlorinator system comprises a chlorinator device and a source of chlorine, such as, for example and without limitation, 12.5% sodium hypochlorite. Water flowing through the chlorinator device can draw chlorine from the chlorine source into the vessel to be chlorinated. The chlorinator device can be configured to allow the amount of chlorine added to the water to be adjustable to a predetermined chlorine level. Also disclosed is a method of chlorinating a vessel.

Referring now to FIGS. 1 and 2, the chlorinator device 10 is illustrated. In one aspect, the chlorinator device 10 can comprise an injector 14 and a chlorine flow meter 16. The injector 14 can be a venturi injector having an injector inlet 18, an opposed injector outlet 20 and a suction port 22 defined in the injector 14 between the injector inlet 18 and the injector outlet 20. As will be described more fully below, the injector inlet 18 can be in fluid communication with a source of water 21 and the suction port 22 can be in fluid communication with a source of chlorine 23. As water passes through the injector inlet 18, the shape of the injector 14 forces the water into a water stream having a higher velocity at the injector outlet 20 than at the injector inlet 18. This increase in velocity through the injector 14 creates a vacuum, thereby causing the chlorine to be sucked through the suction port 22 and mixed into the water stream. Thus, chlorine can be added to the water stream without having to be pumped into the water stream with a mechanical pump. By adjusting the flow rate of water entering the injector inlet 18, a user can adjust the amount of chlorine sucked through the suction port 22. For example, if the inlet speed of the water is increased, the vacuum created can be larger and more chlorine can be entrained into the water stream. If the inlet speed of the water is decreased, the vacuum created can be smaller and less chlorine can be entrained in the water stream. In another aspect, the injector 14 can be a Mazzei Venturi Injector manufactured by the Mazzei Injector Company of Bakersfield, Calif.

In one aspect, the chlorine flow meter 16 can be a flow meter configured to measure and/or control the rate of chlorine entering the water stream. For example, the chlorine flow meter 16 can be positioned in fluid communication with and between the source of chlorine 23 and the suction port 22 of the injector 14. The chlorine flow meter 16 can display the rate of chlorine entering the water stream so that a user of the device 10 can make sure that the desired amount of chlorine is entrained into the water stream. Optionally, in another aspect, the chlorine flow meter 16 can be an adjustable flow meter 24 capable of adjusting the flow of chlorine to the injector 14. That is, the adjustable chlorine flow meter 24 can comprise a valve configured to adjust the flow of chlorine through the adjustable chlorine flow meter 24 to a predetermined rate. In use, the user can adjust the adjustable flow meter 24 so that a predetermined flow rate of chlorine is provided to the suction port 22 of the injector 14. In this aspect then, the flow rate of chlorine into the water stream can be adjusted by adjusting the flow rate of water entering the injector inlet IS and/or adjusting the flow of chlorine to the injector 14 with the adjustable flow meter 24. The adjustable flow meter 24, however, can provide for more precise control of the chlorine flow rate compared to adjusting the flow rate of the water stream alone. In one aspect, the flow meter can be a Blue-White Model F-55376 flow meter manufactured by the Blue-White Industries, LLC of Huntington Beach, Calif.

The injector inlet 18 of the injector 14 can be fluidly coupled to the source of water 21 with at least one upstream pipe 26, at least one upstream fitting 28 and the like. In one aspect, the injector 14, the upstream pipe 26 and the upstream fitting 28 can be sized to provide a desired amount of chlorinated water downstream. In another aspect, at least one upstream pressure gauge 30 and at least one upstream valve 32 can be positioned in fluid communication with and between the source of water 21 and the injector inlet 18. In this aspect, the upstream pressure gauge 30 can be configured to indicate the water pressure in the pipe that couples the injector 14 to the source of water 21. The upstream valve 32 can be, for example, a ball valve configured to stop the flow of water from entering the injector inlet 18. As can be appreciated, the upstream pressure gauge 30 and the upstream valve 32 can be sized to be fluidly coupled to the injector 14, the upstream pipe 26 and/or the upstream fitting 28. Optionally, a backflow preventer 33 can be fluidly coupled to and positioned between the injector inlet 18 and the source of water 21 to prevent or restrict fluid from traveling from the injector inlet 18 towards the source of water 21.

Similarly, the suction port 22 of the injector 14 can be fluidly coupled to the source of chlorine 23 with at least one chlorine pipe 34, at least one chlorine fitting 36 and the like. In one aspect, the injector 14, chlorine pipe 34, and chlorine fitting 36 can be sized to provide a desired amount of chlorinated water downstream. In one aspect, at least one chlorine valve 40 can be positioned in fluid communication with and between the source of chlorine 23 and the suction port 22. The chlorine valve 40 can be, for example, a ball valve configured to stop the flow of chlorine from entering the suction port 22. As can be appreciated, the chlorine valve 40 can be sized to be fluidly coupled to the injector 14, the chlorine flow meter 16, 24, the chlorine pipe 34 and/or the chlorine fitting 36.

The injector outlet 20 of the injector 14 can be fluidly coupled to the vessel to be chlorinated 25 with at least one downstream pipe 42, at least one downstream fitting 44 and the like. In one aspect, the injector 14, downstream pipe 42 and downstream fitting 44 can be sized to provide a desired amount of chlorinated water downstream. In one aspect, at least one downstream pressure gauge 46 and at least one downstream valve 48 can be positioned in fluid communication with and between the injector outlet 20 and the vessel to be chlorinated 25. In this aspect, the downstream pressure gauge 46 can be configured to indicate the water pressure in the line that couples the injector 14 to the vessel to be chlorinated 25. The downstream valve 48 can be, for example, a ball valve configured to stop the flow of chlorinated water from entering the vessel to be chlorinated 25.

As can be appreciated, the downstream pressure gauge 46 and the downstream valve 48 can be sized to be fluidly coupled to the injector 14, the downstream pipe 42 and/or the downstream fitting 44.

For example, the injector 14, upstream pipe 26, upstream fitting 28, upstream pressure gauge 30, upstream valve 32, backflow preventer 33, chlorine pipe 34, chlorine fitting 36, chlorine valve 40, downstream pipe 42, downstream fitting 44, downstream pressure gauge 46, downstream valve 48, and the like can be about ½ inch in diameter, ¾ inches in diameter, 1 inch in diameter, 1¼ inches in diameter, 1½ inches in diameter, 1¾ inches in diameter, 2 inches in diameter, 2¼ inches in diameter, 2½ inches in diameter, 2¾ inches in diameter, 3 inches in diameter, 3¼ inches in diameter, 3½ inches in diameter, 3¾ inches in diameter, 4 inches in diameter, or greater than about 4 inches in diameter. It is not required that each of the injector 14, pipes, fittings, pressure gauges, and valves have the same diameter. For example, a 1-inch injector 14 could be fluidly coupled to a 2-inch upstream pipe 26 with the use of a reducer upstream fitting 28.

In one aspect, the chlorinator device 10 further comprises a housing 50 having a perimeter sidewall 52. In this aspect, the housing 50 can define an interior chamber 54 and can be sized and shaped to position at least a portion of the chlorinator device 10 therein. For example, the injector 14 can be positioned in the chamber 54 of the housing 50. In another example, the chlorine flow meter 16, 24 can be positioned outside of the chamber 54 so that the flow rate displayed by the chlorine flow meter 16, 24 can be easily monitored. At least a portion of the upstream pipe 26, the downstream pipe 42, and the chlorine pipe 34 can also be positioned in the chamber 54 of the housing such that a first end 56*a, b, c* of each pipe is coupled to the injector 14, and a second end 58*a, b, c* of each pipe can extend through the sidewall 52 and outside of the housing 50. Optionally, at least one of the upstream fitting 28, upstream pressure gauge 30, upstream valve 32, chlorine fitting 36, chlorine valve 40, downstream fitting 44, downstream pressure gauge 46, and downstream valve 48 can be positioned in the chamber 54 of the housing 50. Alternatively, at least one of the upstream fitting 28, upstream pressure gauge 30, upstream valve 32, chlorine fitting 36, chlorine valve 40, downstream fitting 44, downstream pressure gauge 46, and downstream valve 48 can be positioned outside of the housing 50.

To assemble the chlorinator device 10, the source of water 21 can be fluidly coupled to the injector inlet 18 of the injector 14 with the upstream pipe 26 and the upstream fitting 28. The upstream valve 32 can be coupled to the second end 58*a* of the upstream pipe 26 and can be in the closed position so that pressurized water is not introduced into the injector 14. The chlorine flow meter 16, 24 can be fluidly coupled to the source of chlorine 23 and to the suction port 22 of the injector 14 with the chlorine pipe 34 and the chlorine fitting 36. The chlorine valve 40 can be positioned between the source of chlorine 23 and the chlorine flow meter 16, 24 and can be in the closed position so that chlorine is not introduced into the injector 14. The vessel to be chlorinated 25 can be fluidly coupled to the injector outlet 20 of the injector 14 with the downstream pipe 42 and the downstream fitting 44. The downstream valve 48 can be coupled to and positioned between the second end 58*c* of the downstream pipe 42 and the vessel to be chlorinated 25 and can be in the closed position so that chlorinated water is not introduced into the vessel to be chlorinated 25.

In use, the downstream valve 48 can be opened, and a point of discharge (such as a valve and the like that allows water to exit the vessel to be chlorinated) in the vessel to be chlorinated 25 can be opened. The upstream valve 32 can then be opened to allow pressurized water to flow through the injector 14. When the pressure displayed in the downstream pressure gauge 46 rises to a predetermined pressure level, the chlorine valve 40 can be opened to allow chlorine to be drawn into the injector 14 by the vacuum created in the injector 14. In one aspect, an approximately 100 parts per million ("ppm") solution of chlorine can be introduced while the pressure is low. The chlorine flow meter 16, 24 can display the rate of chlorine being introduced into the water stream in the injector 14. The chlorine flow rate can be adjusted as desired by adjusting the flow rate of pressurized water entering the injector inlet 18 and/or adjusting the flow rate of chlorine to the injector 14 with the adjustable flow meter 24. For example, the venturi force of the injector 14 and/or the adjustable flow meter 24 can create a suction of chlorine into the injector 14 that is monitored and controlled with the adjustable flow meter 24.

Figure 4:
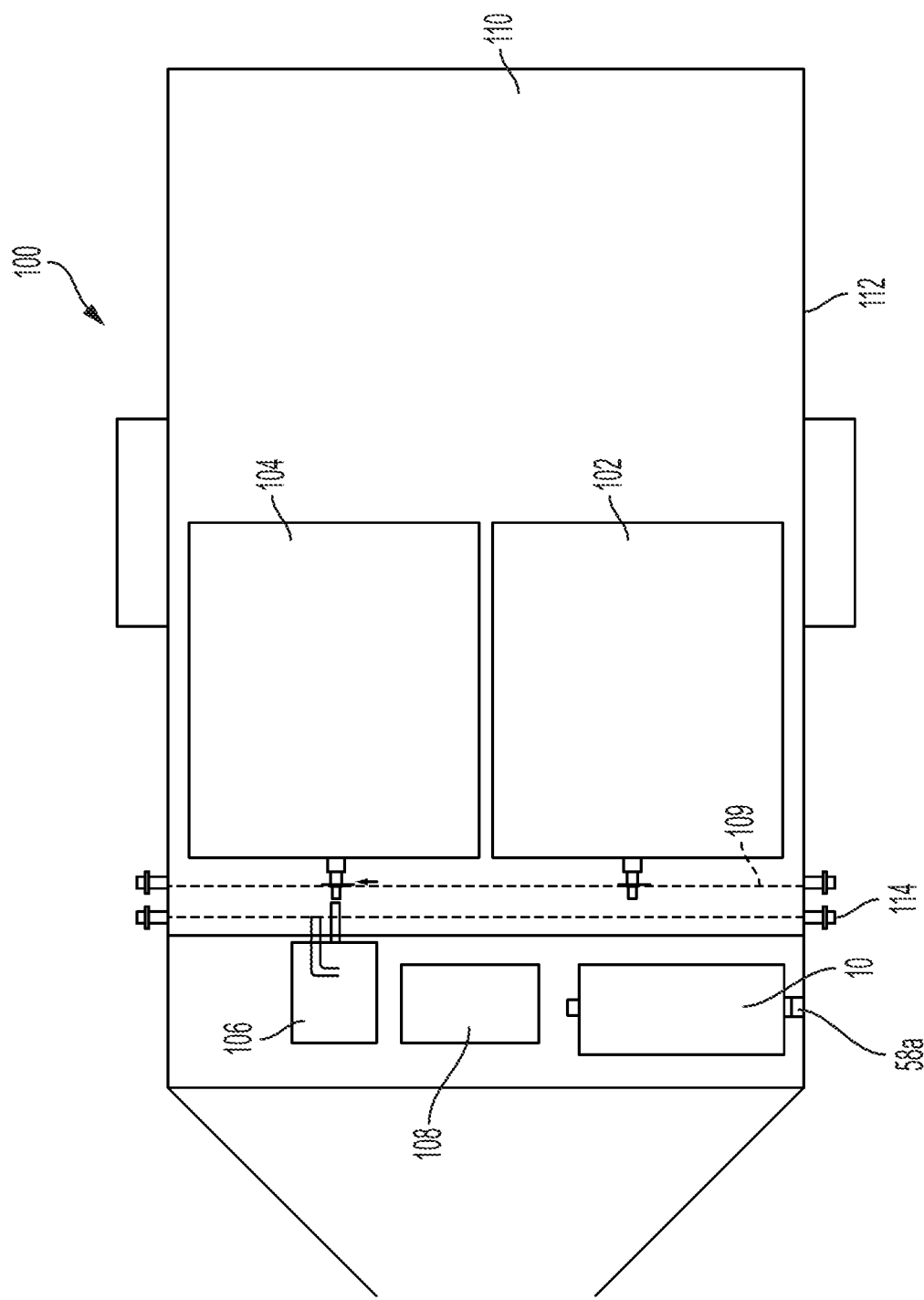
FIG. 4 is a top plan view of the chlorinator system of FIG. 3.

Referring now to FIGS. 3 and 4, a chlorinator system 100 is disclosed. According to one aspect, the chlorinator system 100 can comprise the chlorinator device 10 (as previously described) and other elements to transport and support the chlorinator device 10. For example, the chlorinator system 100 can further comprise at least one of a source of chlorine such as a chlorine tank 102, a source of water such as a water tank 104, a conventional fluid pump 106 and a conventional electrical generator 108. As can be appreciated, the chlorine tank 102 and the water tank 104 can be detachably, fluidly coupled to the chlorinator device 10 with pipes 109, hoses, and the like to provide chlorine and water to the injector 14.

The fluid pump 106 can be fluidly coupled to and positioned between the water tank 104 and the chlorinator device 10 so that the pump 106 can pressurize water from the water tank 104 and provide pressurized water to the injector 14. The electrical generator 108 can be electrically coupled to the fluid pump 106 and can provide electricity to power the pump 106.

Optionally, the chlorinator system 100 can further comprise a device for easily transporting the chlorinator system 100, such as, for example and without limitation, a trailer 110, a truck and the like. In one aspect, hoses, pipes, tubes and the like can extend from the elements of the chlorinator system 100 to a perimeter edge 112 of the trailer 110. For example, the second end 58*a* of the upstream pipe 26 can be positioned near or adjacent an edge 112 of the trailer so that a user of the chlorinator system 100 can easily provide pressurized water to the injector 14. In another example, the second end 58*c* of the downstream pipe 42 can be positioned near or adjacent an edge 112 of the trailer so that a user of the chlorinator system 100 can easily access the chlorinated water. In one aspect, the pipes 109, hoses and the like of the chlorinator system 100 can be fitted with quick-release fittings 114, such as cam-lock fittings, so that a user of the chlorinator system 100 can quickly access the chlorinated water.

To use the chlorinator system 100, in one embodiment, the trailer 110 can be transported to a job site. The chlorine tank 102 can be fluidly coupled to the second end 58*b* of the chlorine pipe 34 and the water tank 104 can be fluidly coupled to the second end 58*a* of the upstream pipe 26. The pump 106 can be fluidly coupled to and positioned between the second end 58*a* of the upstream pipe 26 and the water tank 104. The downstream pipe 42 can be fluidly coupled to the vessel to be chlorinated (not shown in FIGS. 3 and 4).

The upstream valve 32 can be in the closed position so that pressurized water is not introduced into the injector 14. The chlorine valve 40 can be in the closed position so that chlorine is not introduced into the injector 14. The downstream valve 48 can be in the closed position so that chlorinated water is not introduced into the vessel to be chlorinated.

In use, the downstream valve 48 can be opened, and a point of discharge (such as a valve and the like that allows water to exit the vessel to be chlorinated) in the vessel to be chlorinated can be opened. The water in the water tank 104 can flow through the pump 106 that has electricity from the generator 108 to create at least 40 psi and provide pressurized water to the upstream pipe 26. The upstream valve 32 can then be opened to allow pressurized water to flow through the injector 14. When the pressure displayed in the downstream pressure gauge 46 (Gage—right gauge?) rises to a predetermined pressure level, the chlorine valve 40 can be opened to allow chlorine to be sucked into the injector 14. For example, an approximately 100 parts per million ("ppm") solution of chlorine can be introduced while the pressure is low. The chlorine flow meter 16 can display the flow rate of chlorine entering the water stream. The chlorine flow rate can be adjusted as desired by adjusting the flow rate of pressurized water entering the injector inlet 8 and/or adjusting the flow of chlorine to the injector 14 with the adjustable flow meter 24.

Figure 5:
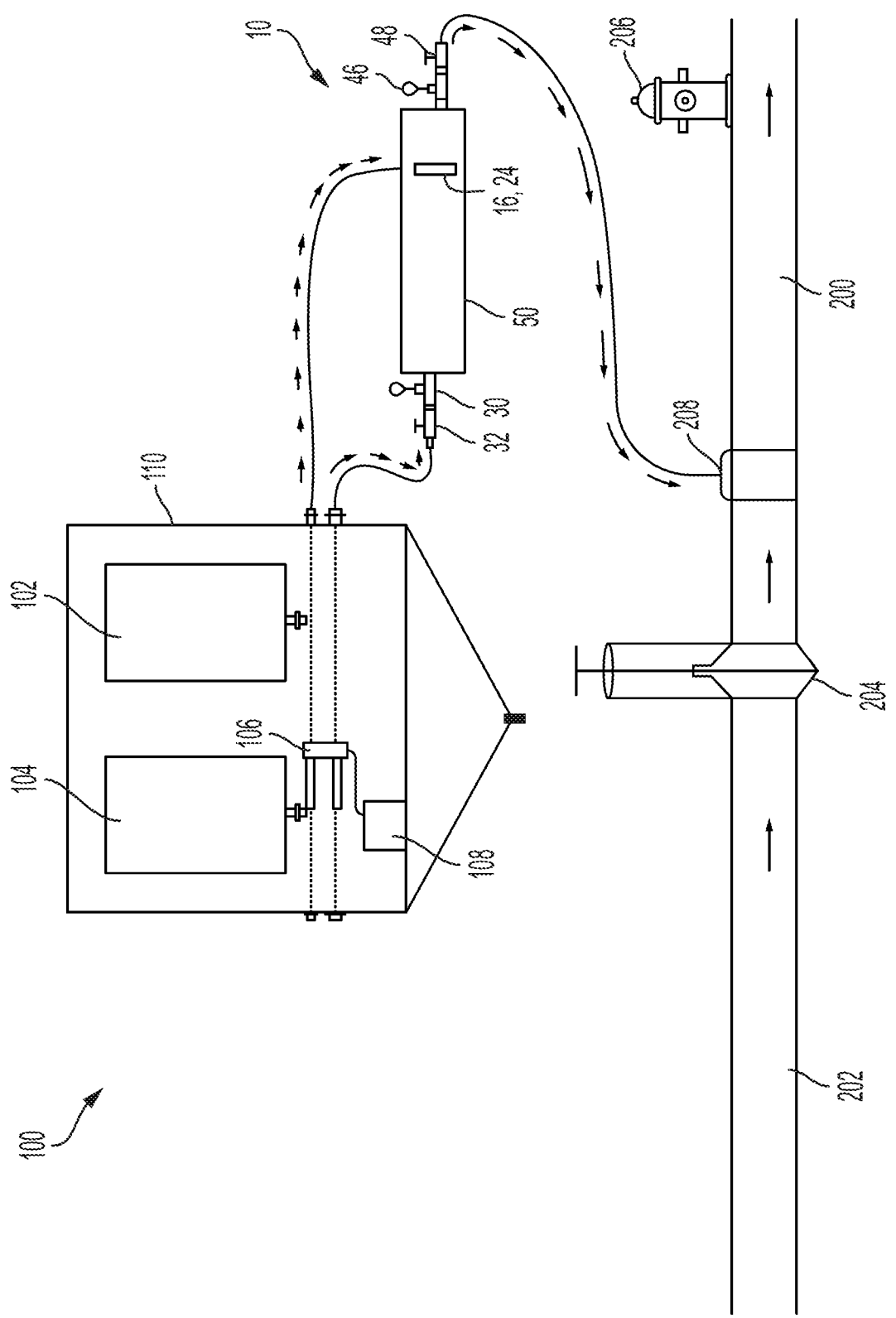
FIG. 5 is a schematic view of the chlorinator system of FIG. 3, in use without an existing water source to supply water to the chlorinator device, according to one aspect.

Another embodiment of using the chlorinator system 100 is illustrated in FIG. 5. In this embodiment, the vessel to be chlorinated 200 is fluidly coupled to an existing source of water, such as a water main 202 and the like. A valve, such as a tie-in valve 204 can be positioned between the vessel 200 and the water main 202 and a point of discharge 206 can allow water to exit the vessel 200. The downstream pipe 42 can be fluidly coupled to the vessel 200 at an injection point 208 on the vessel 200. The tie-in valve 204 can be closed so that fluid cannot flow between the water main 202 and the vessel 200. The points of discharge 206 can be opened to drop the pressure in the vessel 200 to zero. As the line pressure begins to drop below the static pressure, the water in the water tank 104 can flow through the pump 106 to provide pressurized water to the injector 14, which creates a suction of chlorine through the injector 14 to chlorinate the water. This chlorinated water solution is introduced into the vessel 200 through the injection point 208. The tie-in valve 204 can be opened to push the solution through the vessel 200 to the points of discharge 206. In one aspect, the tie-in valve 204 can be used to adjust the flow of the solution and/or the chlorine level through the vessel 200.

Figure 6:
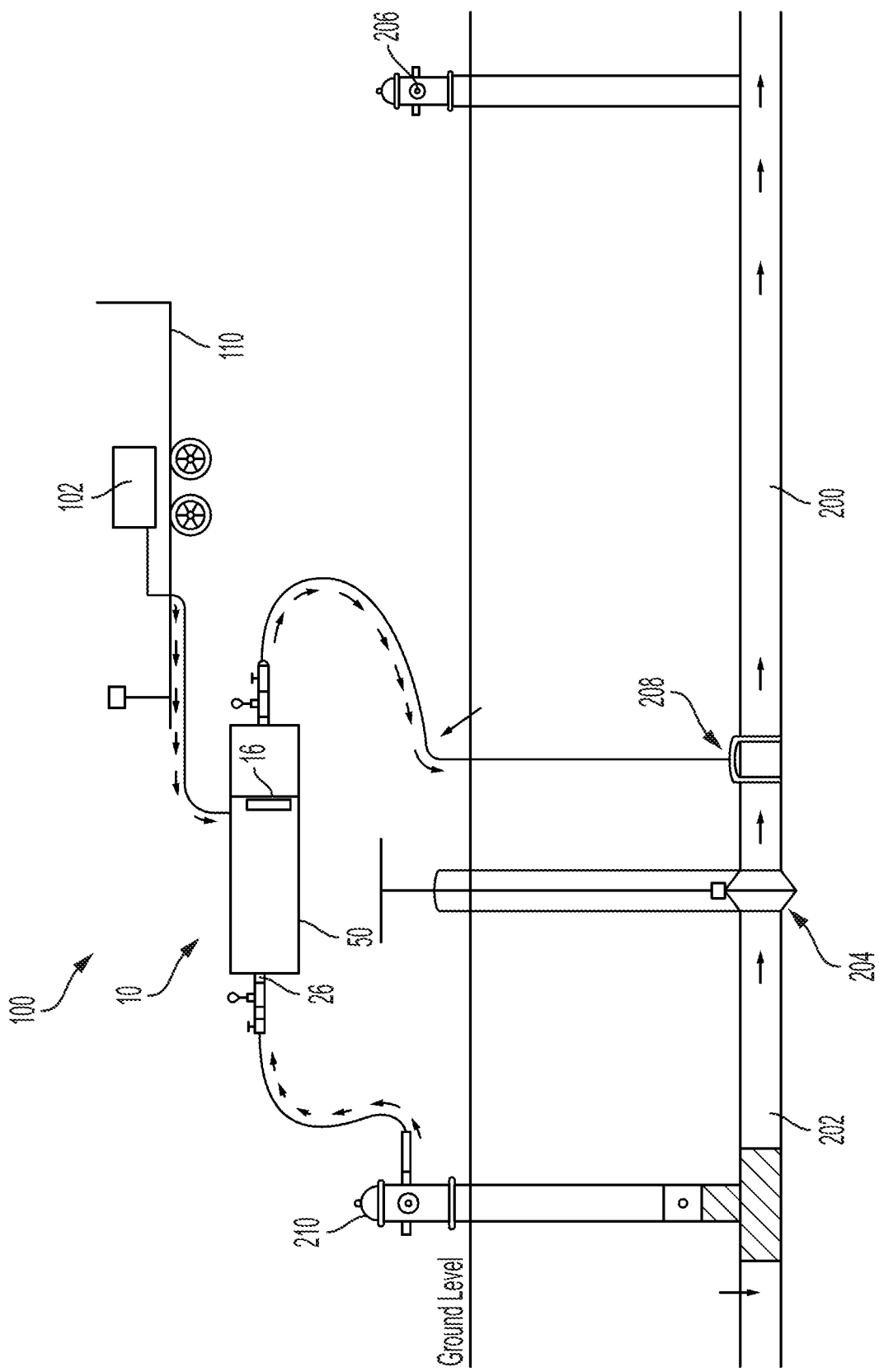
FIG. 6 is a schematic view of the chlorinator system of FIG. 3, in use with an existing water source to supply water to the chlorinator device, according to one aspect.

Yet another embodiment of using the chlorinator system 100 is illustrated in FIG. 6. In this embodiment, the vessel 200 to be chlorinated is fluidly coupled to an existing source of water, such as a water main 202 and the like. The tie-in valve 204 can be positioned between the vessel 200 and the water main 202 and a point of discharge 206 can allow water to exit the vessel 200. An existing source of pressurized water 210 can be provided so that the water tank 104 can be bypassed. That is, the existing source of pressurized water 210 can be fluidly coupled to the upstream pipe 26 to provide pressurized water through the injector 14. The downstream pipe 42 can be fluidly coupled to the vessel 200 at the injection point 208 on the vessel 200. The tie-in valve can be closed so that fluid cannot flow between the water main 202 and the vessel 200. The points of discharge 206 can be opened to drop the pressure in the vessel 200 to zero. As the line pressure begins to drop below the static pressure, water from the existing source of pressurized water 210 can provide pressurized water to the injector 14, which creates a suction of chlorine through the injector 14 to chlorinate the water. This chlorinated water solution is introduced into the vessel 200 through the injection point 208. The tie-in valve 204 can be opened to push the solution through the vessel 200 to the points of discharge 206. In one aspect, the tie-in valve 204 can be used to adjust the flow of the solution and/or the chlorine level through the vessel 200.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A chlorinator system for chlorinating a vessel to a predetermined chlorination level, the chlorinator system comprising:
    a chlorinator device comprising:
        an injector having an injector inlet, an opposed injector outlet and a suction port defined in the injector between the injector inlet and the injector outlet, and wherein the injector outlet is in fluid communication with the vessel, and wherein the injector is a venturi injector such that as a water stream passes from the injector inlet to the injector outlet, the injector creates a vacuum to draw chlorine from the source of chlorine and into the water stream passing through the injector; and
        an adjustable chlorine flow meter positioned in fluid communication with and between the suction port and the source of chlorine, the adjustable chlorine flow meter configured to adjust the flow rate of chlorine passing through the adjustable chlorine flow meter, wherein the chlorine flow rate entering the vessel is selectively adjustable to a predetermined rate by adjusting the flow rate of the water stream, and wherein the chlorine flow rate is selectively adjustable to a predetermined rate by adjusting the adjustable chlorine flow meter;

at least one chlorine tank in fluid communication with the suction port of the injector;

at least one water tank in fluid communication with the injector inlet;

a fluid pump in fluid communication with and positioned between the water tank and the injector inlet, the fluid pump configured to provide pressurized water from the water tank to the injector to create the water stream;

an electrical generator electrically coupled to the fluid pump and configured to provide electricity to power the fluid pump; and a transporting device for transporting the chlorinator device, the chlorine tank, the water tank, the fluid pump and the electrical generator.

2. The chlorinator system of claim 1, wherein the transporting device is a trailer.

3. The chlorinator system of claim 2, further comprising a housing having a perimeter sidewall that defines an interior chamber.

4. The chlorinator system of claim 3, wherein the injector is positioned in the interior chamber of the housing, and wherein the adjustable chlorine flow meter is positioned outside of the interior chamber.

5. The chlorinator system of claim 4, further comprising an upstream pipe and a downstream pipe, wherein each of the upstream pipe and the downstream pipe have a first end and an opposed second end, wherein the first end of the upstream pipe is fluidly coupled to the injector inlet, and wherein the first end of the downstream pipe is fluidly coupled to the injector outlet.

6. The chlorinator system of claim 5, wherein the first end of the upstream pipe and the first end of the downstream pipe are positioned in the interior chamber, and wherein the second end of the upstream pipe and the second end of the downstream pipe are positioned outside the interior chamber.

7. The chlorinator system of claim 6, wherein the second end of the upstream pipe is positioned adjacent a perimeter edge of the trailer, and wherein the second end of the downstream pipe is positioned adjacent a perimeter edge of the trailer.

8. The chlorinator system of claim 7, wherein the second end of the upstream pipe and the second end of the downstream pipe are fitted with cam-lock fittings.

9. A method for chlorinating a vessel to a predetermined chlorination level, wherein the vessel to be chlorinated is fluidly coupled to an existing source of water, wherein a tie-in valve is positioned between the vessel and the source of water and is originally closed to prevent water from moving from the source of water to the vessel, and wherein the vessel has a point of discharge that allows water to exit the vessel, the method comprising:

providing a chlorinator system comprising:

an injector having an injector inlet, an opposed injector outlet and a suction port defined in the injector between the injector inlet and the injector outlet, and wherein the injector outlet is in fluid communication with the vessel, and wherein the injector is a venturi injector such that as a water stream passes from the injector inlet to the injector outlet, the injector creates a vacuum to draw chlorine from the source of chlorine and into the water stream passing through the injector; and an adjustable chlorine flow meter positioned in fluid communication with and between the suction port and the source of chlorine, the adjustable chlorine flow meter configured to adjust the flow rate of chlorine passing through the adjustable chlorine flow meter, wherein the chlorine flow rate is selectively adjustable to a predetermined rate by adjusting the flow rate of the water stream, and wherein the chlorine flow rate is selectively adjustable to a predetermined rate by adjusting the adjustable chlorine flow meter;

at least one chlorine tank in fluid communication with the suction port of the injector;

at least one water tank in fluid communication with the injector inlet;

a fluid pump in fluid communication with and positioned between the water tank and the injector inlet, the fluid pump configured to provide pressurized water from the water tank to the injector to create the water stream;

an electrical generator electrically coupled to the fluid pump and configured to provide electricity to power the fluid pump; and a transporting device for transporting the chlorinator device, the chlorine tank, the water tank, the fluid pump and the electrical generator;

coupling the injector outlet to the vessel at an injection point on the vessel;

opening the point of discharge in the vessel;

pumping pressurized water to the injector inlet with the fluid pump to create a suction of chlorine through the injector that chlorinates the water passing through the injector;

opening the tie-in valve to push the water and chlorine through the water vessel to the points of discharge; and adjusting the flow rate of the water and chlorine solution to a desired rate with the tie-in valve and the adjustable chlorine flow meter.

10. The method of claim 9, wherein the chlorinator system further comprises a housing having a perimeter sidewall that defines an interior chamber.

11. The method of claim 10, wherein the injector is positioned in the interior chamber of the housing, and wherein the adjustable chlorine flow meter is positioned outside of the interior chamber.

* * * * *